UNITED STATES PATENT OFFICE.

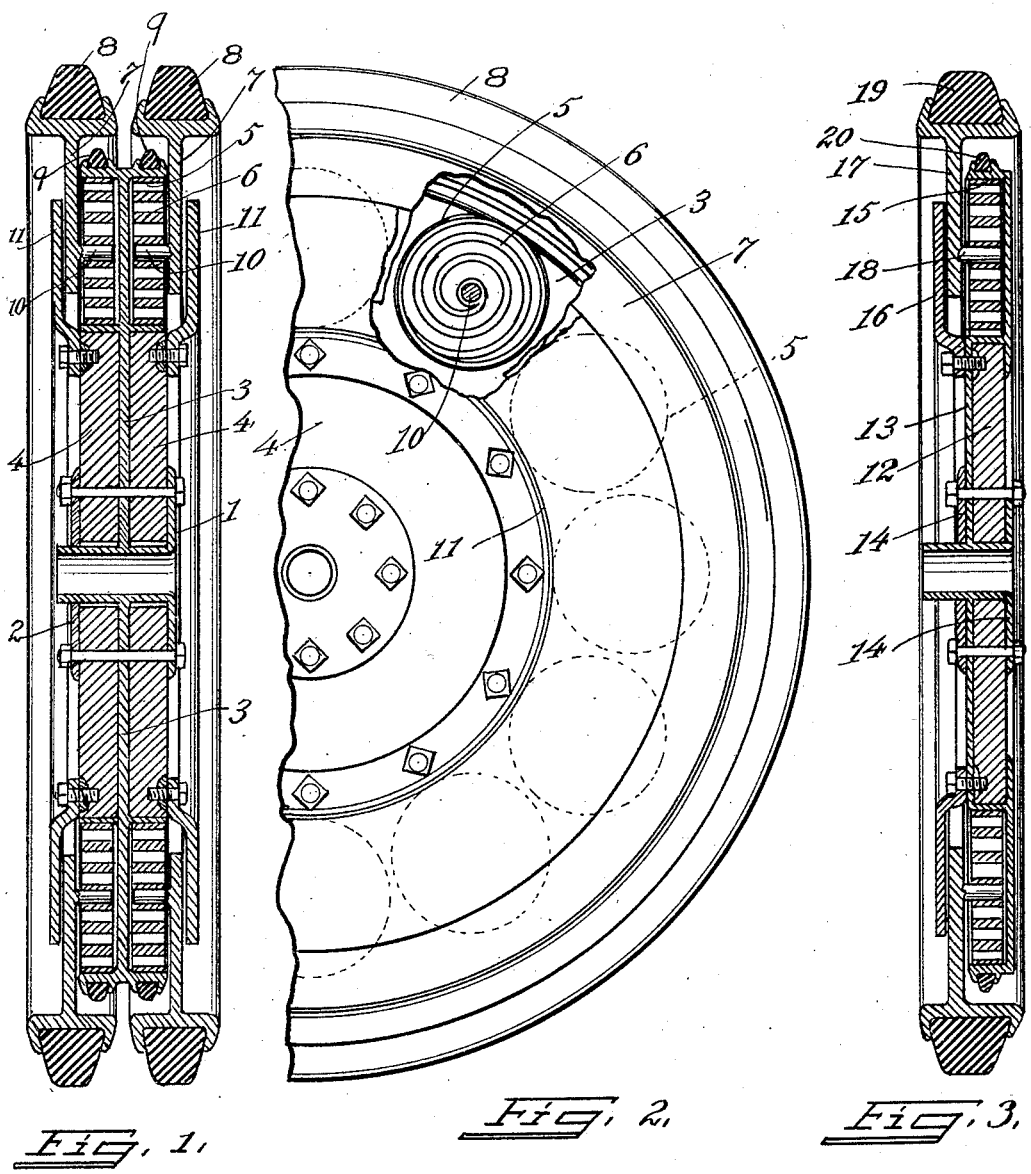

RUPERT H. LANGDALE, OF CINCINNATI, OHIO.

SPRING WHEEL.

1,410,261.  Specification of Letters Patent.  Patented Mar. 21, 1922.

Application filed November 18, 1919. Serial No. 338,921.

*To all whom it may concern:*

Be it known that I, RUPERT H. LANGDALE, a citizen of the United States, and a resident of the city of Cincinnati, in the county of Hamilton and State of Ohio, have invented certain new and useful Improvements in Spring Wheels, of which the following is a full, clear, and exact description, reference being had to the accompanying drawings, forming a part of this specification.

My invention relates to spring wheels, particularly of the type used for motor vehicles, and has as its object the provision of a floating and resilient rim for such wheels, of a specially strong and durable character, while possessing a high degree of resiliency.

One of the main difficulties of spring wheels for vehicles is the fact that the springs, in order to be of much value in taking up shocks, have been necessarily of a weight which tended to break down under wear.

In my invention herein, I have provided for spiral springs to support the resilient rim of my invention, and at the same time provide for a method of mounting the springs, which avoids the securing of either end of the same in any fixed relation to the parts of the wheel. A coiled spring which is free to move at either end, I have found to last much longer than one which is held fast, the reason for this being that the jars to which the spring is subjected tend to break it at the point of attachment.

My objects and other advantages to be noted I accomplish by that certain construction and arrangement of parts to be hereinafter more specifically pointed out and claimed.

In the drawings,

Figure 1 is a central cross section of a wheel made up according to my invention.

Figure 2 is a side elevation of a like wheel with the side pieces broken away to show one of the spring chambers.

Figure 3 is a central cross section of a modified type of wheel.

I have shown in the drawings a single tread wheel (Figure 3) and a double tread wheel (Figure 1) and will describe them separately for the purpose of clearness although the one is a mere duplication of parts of the other.

Referring to Figure 1 there are two hub plates 1 and 2 between which are bolted an assembly consisting of the web plate 3, and two facing plates 4, 4, one on each side thereof.

The central plate or web plate 3 extends beyond the periphery of the facing plates, and is formed with a series of circular chambers or cups 5, 5, spaced around its outer edge. These cups are of the proper size to receive each, a coiled spring 6, which is not fastened therein but merely seated and embraced at its periphery by the walls of the cups.

There are shown two sets of cups, one on each side of the central plate, and there are shown also two annular rim plates 7, 7, each having at its periphery a suitably retained resilient tire 8. It is preferred also that the periphery of the central plate, which is outside of the walls of the cups, be equipped with a resilient bumper element 9.

The rim plates have formed thereon a series of posts or pins 10, which extend laterally to the right for one of the plates and to the left for the other. The pins are to be inserted at the center of the coiled springs, but merely set loosely therein and not attached.

The wheel is completed by the addition of two annular guard plates 11, 11, one on each side, they being bolted or secured as desired to the facing plates.

As so constructed the wheel is assembled as follows: The hub plates, web plate, and facing plates are secured together, and the springs set in the cups on one side of the wheel. The rim plate for that side is then set in place with its pins entering the center of the springs. The guard plate is then mounted to secure the rim plates against withdrawal, and the wheel turned over and the operation completed for the other side in the same manner.

The wheel is then ready for use. The rim plates cannot fall out of place, since they are held through the medium of the web plates and the guard plates. The said rim plates have also a resiliency in the nature of a floating suspension, said resiliency of movement being limited by the strength of the springs, and the size of the cups wherein the springs are set.

The guard plates hold the spring against falling out of the cups, and the springs are not fastened at any point, thereby having free play at the ends, which greatly extends their period of usefulness.

The bumpers at the periphery of the web plate take care of any excessive bump imparted to the rim, and the resilient treads for the rim plates prevent rattling noise and cushion the rims on the road surface.

As shown in Figure 3 there is but a single facing plate 12, secured together with a web plate 13, to hub plates 14. Cups 15 are formed at the periphery of the web plates, and a guard plate 16 used. The rim plate 17, of which there is but one, has a post or pin 18, and there is the resilient tread 19 for the rim plate, and the bumper element 20 for the periphery of the web plate.

The assembly and operation of the single tread wheel will be readily apparent from the description we have made of the above double tread wheel.

Having thus described my invention what I claim as new and desire to secure by Letters Patent is:—

1. A spring wheel comprising in part a hub, a web portion and a rim portion, the web portion having circular cups spaced around its edge, coiled springs loosely mounted with free ends in said cups, the rim portion provided with an inwardly extending flange having posts adapted to seat in the center of said coiled springs, and guard plates secured to one of said parts and overlapping the other on the side opposite the posts to maintain the parts in assembly.

2. A spring wheel comprising in part a hub, a web portion and a rim portion, cups in the web portion, spiral springs loosely mounted with their free ends in said cups, the rim portion provided with an inwardly extending flange having posts extending from the flange into the cups for engaging loosely in the springs, and means for maintaining said web and rim portion together, comprising an annular plate secured to and extending around the web portion and overlapping the flange of the rim portion on the side opposite the posts.

3. A spring wheel comprising in part a hub, a web portion and a rim portion, cups in the web portion, spiral springs loosely mounted with free ends in said cups, and posts extending from the rim portion for engaging loosely in the springs, and means for maintaining said web and rim portion together, the web portion being provided with a peripheral band with a strip of resilient material carried by said peripheral band to serve as a bumper element.

RUPERT H. LANGDALE.